United States Patent
Yoon et al.

(10) Patent No.: US 8,988,521 B2
(45) Date of Patent: Mar. 24, 2015

(54) METHOD OF MEASURING CRITICAL DIMENSION OF PATTERN AND APPARATUS FOR PERFORMING THE SAME

(75) Inventors: Han-June Yoon, Seoul (KR); Hyung-Joo Lee, Suwon-si (KR); Won-Joo Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 744 days.

(21) Appl. No.: 13/236,932

(22) Filed: Sep. 20, 2011

(65) Prior Publication Data
US 2012/0105617 A1    May 3, 2012

(30) Foreign Application Priority Data

Nov. 2, 2010 (KR) .......... 10-2010-0108140

(51) Int. Cl.
  *H04N 7/18*   (2006.01)
  *G06K 9/62*   (2006.01)
  *G06T 7/60*   (2006.01)

(52) U.S. Cl.
  CPC ...................... *G06T 7/60* (2013.01)
  USPC ........................................ 348/80

(58) Field of Classification Search
  CPC ...................................................... H01J 37/28
  See application file for complete search history.

(56) References Cited

U.S. PATENT DOCUMENTS

| | | | |
|---|---|---|---|
| 2002/0159053 A1* | 10/2002 | Nair et al. | 356/237.2 |
| 2009/0268215 A1* | 10/2009 | McNamara et al. | 356/635 |
| 2010/0136717 A1* | 6/2010 | Shin et al. | 438/14 |
| 2010/0158389 A1* | 6/2010 | Mitsui | 382/199 |

FOREIGN PATENT DOCUMENTS

| | | |
|---|---|---|
| JP | 2008-235575 | 10/2008 |
| JP | 2009-188239 | 8/2009 |
| KR | 10-2003-0095746 A | 12/2003 |

* cited by examiner

*Primary Examiner* — Sath V Perungavoor
*Assistant Examiner* — Kate Luo
(74) *Attorney, Agent, or Firm* — Lee & Morse, P.C.

(57) ABSTRACT

In a method of measuring a critical dimension of a pattern, a pattern image is obtained from an object pattern. A design pattern of the object pattern and the pattern image are matched to determine a detection region on the pattern image. An optimum turning point of the pattern contour is determined in the detection region and a ROI (region of interest) is set within a predetermined range from the optimum turning point. A critical dimension of the pattern is measured in the ROI.

19 Claims, 6 Drawing Sheets

METHOD OF MEASURING CRITICAL DIMENSION OF PATTERN AND APPARATUS FOR PERFORMING THE SAME

CROSS REFERENCE TO RELATED APPLICATION

Korean Patent Application No. 10-2010-0108140, filed on Nov. 2, 2010, in the Korean Intellectual Property Office, and entitled: "Method of Measuring Critical Dimension of Pattern and Apparatus for Performing the Same," is incorporated by reference herein in its entirety.

BACKGROUND

1. Field

Example embodiments relate to a method of measuring a critical dimension of a pattern and a apparatus for performing the same. More particularly, example embodiments relate to a method of measuring a line width of a pattern formed on a substrate and an apparatus for measuring the line width of the pattern.

2. Description of the Related Art

During manufacture of a semiconductor device, it may be necessary to precisely measure fine patterns that are formed by a photolithography process, an etch process, etc. In order to check whether or not a pattern is formed to have a precise dimension, an electrical performance inspection process or a critical dimension measuring process may be performed.

For example, a critical dimension (CD) of a pattern may be detected by a scanning electron microscope (SEM). CD corresponds to dimensions of the smallest geometrical features (width of interconnect line, contacts, trenches, etc.) that can be formed during a semiconductor device manufacturing process.

In a conventional method of measuring a pattern, an electron beam is irradiated onto an object pattern to obtain a SEM image. Then, after a ROI (region of interest) is set by a recipe or user, a critical dimension of the pattern may be detected in the ROI.

However, in case that the pattern is complicated or fine, it may be difficult to determine the ROI, and the determination of the ROI demands skill and experience. Accordingly, a method of accurately and rapidly determining a ROI of a pattern and measuring the pattern may be required.

SUMMARY

One or more embodiments provide a critical dimension measuring method capable of measuring a pattern precisely and rapidly.

One or more embodiments provide an apparatus configured to measure a critical dimension pattern precisely and rapidly.

One or more embodiments provide a method of measuring a critical dimension of a pattern that includes matching a real pattern image and a design pattern of the pattern to determine a detection region on the pattern image, determining an optimum turning point of the real pattern contour in the detection region, and then, determining a ROI (region of interest) within a predetermined range from the optimum turning point. A critical dimension of the pattern may be measured in the ROI.

One or more embodiments may enable a ROI of a pattern to be detected to be automatically and precisely determined and a critical dimension of the pattern to be measured with a relatively high degree of precision. One or more embodiments may enable reproducibility of measured line widths of the pattern to be improved and/or a critical dimension of a fine pattern or OPCed pattern (optical proximity corrected pattern) to be measured more precisely.

One or more embodiments provide a method of measuring a critical dimension of a pattern, including obtaining a pattern image from an object pattern, matching a design pattern of the object pattern and the pattern image to determine a detection region on the pattern image, determining an optimum turning point of the pattern contour in the detection region and setting a ROI (region of interest) within a predetermined range from the optimum turning point, and measuring a critical dimension of the pattern in the ROI.

Determining the detection region may include obtaining a corresponding relation between the contour of the design pattern and the pattern contour using design data of the design pattern, and determining the detection region including expected single points or regions of the pattern contour on the pattern image based on the corresponding relation.

Determining the optimum turning point of the pattern contour may include obtaining coordinates at predetermined intervals along the contour of the pattern within the detection region, and determining a single point of the coordinates as the optimum turning point.

Determining a single point of the coordinates as the optimum turning point may include determining a respective one of the coordinates at which a tangent line of the pattern contour changes and/or the pattern contour has an unusual behavior compared to other coordinates as the optimum turning point.

Determining a single point of the coordinates as the optimum turning point may include determining, as the optimum turning point, a respective one of the coordinates at which the tangent line of the pattern contour changes at least by a predetermined amount.

Setting the ROI may include calculating the center of the ROI using the optimum turning point, and determining a width of the ROI that is offset by a predetermined distance from the optimum turning point.

Measuring the critical dimension of the pattern in the ROI may include obtaining coordinates of the pattern contour in the ROI, and calculating an average of the coordinates of the pattern contour.

Obtaining a pattern image may include irradiating and scanning primary electrons on the pattern, and detecting secondary electrons from the pattern to obtain the pattern image.

One or more embodiments provide an apparatus for measuring a critical dimension of a pattern, including a contour detecting portion configured to detect a pattern contour from a pattern image of an object pattern, a matching portion configured to match a design pattern of the object pattern and the pattern image to determine a detection region on the pattern image, a ROI determination portion configured to determine an optimum turning point of the pattern contour in the detection region and set a ROI (region of interest) within a predetermined range from the optimum turning point, and a measuring portion configured to measure a critical dimension of the pattern in the ROI.

The matching portion may obtain a corresponding relation between the contour of the design pattern and the pattern contour using design data of the design pattern, and may determine the detection region including expected single points or regions of the pattern contour on the pattern image based on the corresponding relation.

The ROI determination portion may obtain coordinates at predetermined intervals along the contour of the pattern within the detection region, and determines a single point of the coordinates as the optimum turning point.

The ROI determination portion may calculate the center of the ROI using the optimum turning point, and determines a width of the ROI that is offset by a predetermined distance from the optimum turning point.

The measuring portion may obtain coordinates of the pattern contour in the ROI, and calculates an average of the coordinates of the pattern contour.

One or more embodiments provide an apparatus for measuring a critical dimension of an object pattern using a pattern image of the object pattern, the pattern image including a boundary of the object pattern, including a region-of-interest (ROI) determinator configured to determine at least one optimum reference point along the boundary of the pattern image in a detected region of the object pattern and set a ROI within a predetermined range from the optimum reference point, and a measuring unit configured to measure a critical dimension of a portion of the pattern in the ROI.

The apparatus may include a pattern matcher configured to align a design pattern of the object pattern and the pattern image to determine the detected region of the pattern image.

The pattern matcher may determine a plurality of reference points and/or regions along the boundary of the pattern image in the detected region surrounding a portion of the pattern to be measured by the measuring unit.

The plurality of reference points may be determined by sampling every x-th pixel along the boundary of the pattern, where x is an integer equal to or greater than one.

The ROI determinator may be configured to determine at least one optimum reference point among the plurality of reference points and/or regions along the boundary of the pattern image to set a ROI region at a predetermined distance from the at least one optimum reference point.

The ROI determinator may be configured to determine the at least one optimum reference point from among the plurality of reference points based on characteristics of tangent lines tangent to the respective points along the boundary of the pattern.

The ROI determinator may be configured to determine a plurality of optimum reference points including an upper optimum reference point and a lower optimum reference point along a single direction and to set the ROI to be a predetermined distance from each of the upper optimum reference point and the lower optimum reference point.

BRIEF DESCRIPTION OF THE DRAWINGS

Features will become more apparent to those of ordinary skill in the art by describing in detail exemplary embodiments with reference to the attached drawings, in which.

DETAILED DESCRIPTION

Various example embodiments will be described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of layers and regions may be exaggerated for clarity.

Hereinafter, example embodiments will be explained in detail with reference to the accompanying drawings.

Figure 1:
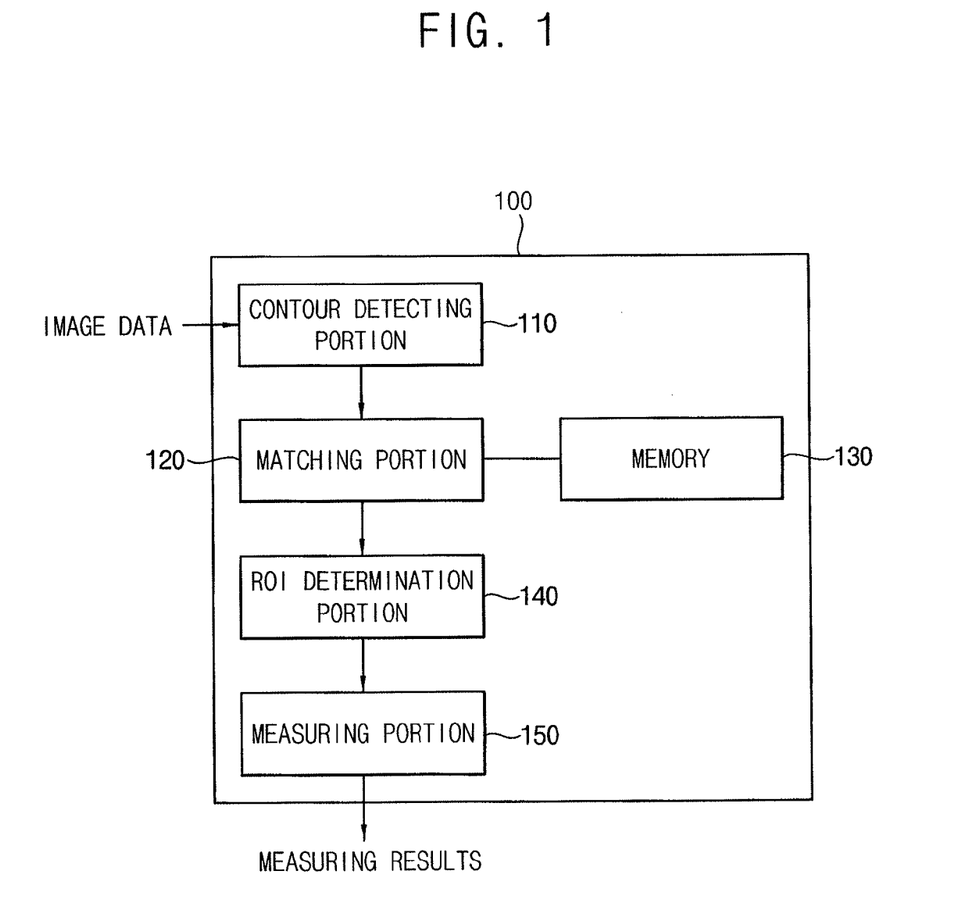
FIG. 1 illustrates a block diagram of an exemplary embodiment of an apparatus for measuring a critical dimension of a pattern.

FIG. 1 illustrates a block diagram of an exemplary embodiment of a critical dimension measuring apparatus 100 for measuring a critical dimension of a pattern.

Referring to FIG. 1, the critical dimension measuring apparatus 100 may include a contour detecting portion 110, a matching portion 120, a memory 130, a ROI (region of interest) determination portion 140, and a measuring portion 150.

In one or more embodiments, the contour detecting portion 110 may receive image data of an object pattern (not illustrated) from an optical inspection apparatus (not illustrated) and may detect a contour, e.g., boundary, of the pattern from the image data. For example, the optical inspection apparatus may include an optical microscope such as scanning electron microscope.

The matching portion 120 may match a design pattern corresponding to the object pattern and the pattern image to determine a detection region on the pattern image. The matching portion 120 may be configured to communicate with the memory 130. The memory 130 may store design data of the design pattern.

The matching portion 120 may use the design data of the design pattern from the memory 130, and may obtain a corresponding relation, e.g., alignment, between the contour of the design pattern and the contour of the pattern image (pattern contour). The matching portion 120 may then determine a detection region (DR) including expected single points and/or regions of the pattern contour on the pattern image.

The ROI determination portion 140 may determine an optimum reference point, e.g., an optimum turning point, in the detection region and determine a ROI (region of interest) within a predetermined range from the optimum turning point. The optimum reference point may correspond to a point having a special characteristic that enables the point to be distinguished from other points, e.g., when a tangent line changes, e.g., by a predetermined percentage/range, etc, so as to enable precise matching, e.g., alignment, of the design pattern and the pattern image.

The ROI determination portion 140 may obtain coordinates at predetermined intervals along the contour of the pattern within the detection region (DR), and may determine a single point of the coordinates as the optimum turning point.

The ROI determination portion 140 may be configured to communicate with the memory 130. The ROI determination portion 140 may determine the ROI according to a ROI determination method that is stored in the memory 130. In one or more embodiments, e.g., a center of the ROI may be calculated using the optimum turning points, and a width of the ROI may be determined as being offset by a predetermined distance from the optimum turning point.

The measuring portion 150 may measure a critical dimension of the pattern in the ROI. The measuring portion 150 may calculate averages of the coordinates of the pattern contour in the ROI to determine the critical dimension of the pattern.

Hereinafter, an exemplary embodiment of a method of measuring a critical dimension of a pattern using the measuring apparatus 100 in FIG. 1 will be explained.

Figure 2:
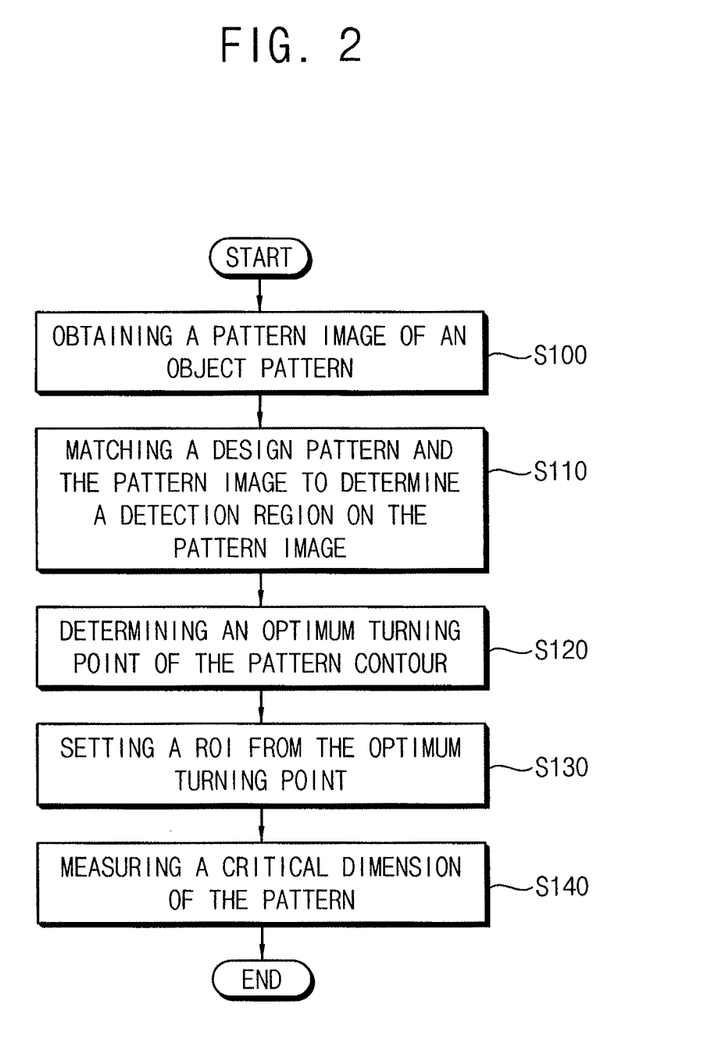
FIG. 2 illustrates a flow chart of an exemplary embodiment of a method of measuring a critical dimension of a pattern.
Figure 3:
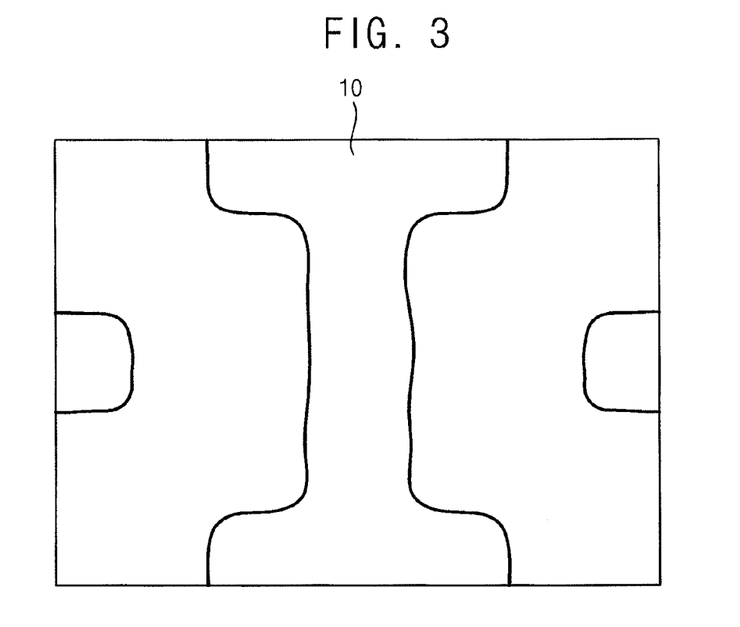
FIG. 3 illustrates an image of a pattern formed on a substrate.
Figure 4:
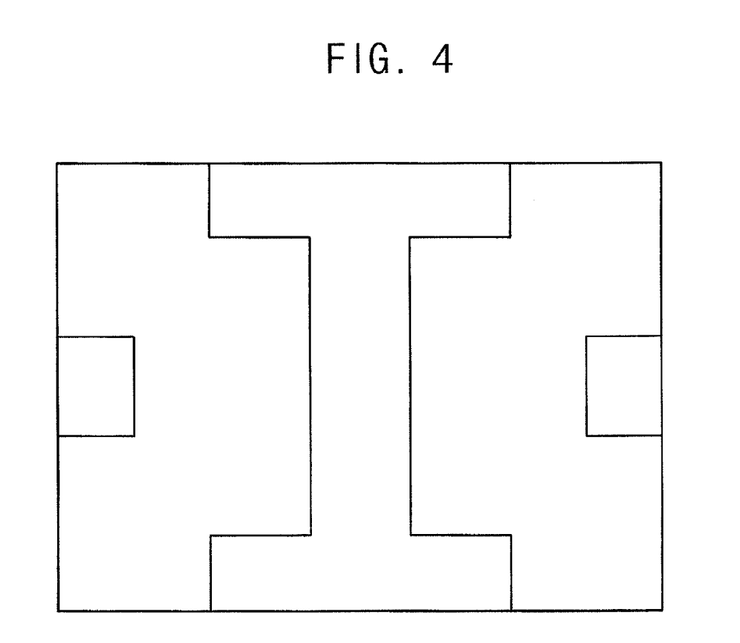
FIG. 4 illustrates a top-down view of a design pattern corresponding to the formed pattern of FIG. 3.

FIG. 2 illustrates a flow chart of an exemplary embodiment of a method of measuring a critical dimension of a pattern. FIG. 3 illustrates a top-down view of an image of a pattern formed on a substrate. FIG. 4 illustrates a top-down view of a design pattern corresponding to the formed pattern of FIG. 3. FIGS. 5 to 8 illustrate diagrams of exemplary embodiments of methods of measuring a critical dimension of a pattern.

Referring to FIGS. 2 and 3, a pattern image 10 may be obtained from an object pattern (S100). The obtained pattern image 10 may then be matched with a corresponding design pattern (see, e.g., FIG. 4) and a detection region on the pattern image may be determined (S110). An optimum turning point of a pattern contour of the pattern image may be then be determined (S120). A region of interest (ROI) may then be set based on the determined optimum turning point (S130). A critical dimension of the formed pattern corresponding to the pattern image may then be measured (S140).

More particularly, a substrate having a pattern formed thereon may be prepared. For example, the substrate may be a wafer or a reticle. Then, e.g., during S100, a scanning electron microscope may irradiate and scan primary electrons onto the substrate and detect secondary electrons from the substrate to obtain an image data of the pattern, e.g., the pattern image 10.

In such embodiments, the secondary electrons may be electrons ionized from atoms in the substrate by the primary electrons. The secondary electrons may have different energies according to a surface of the substrate or a shape of the pattern. For example, the secondary electron may have a higher energy on an inclined surface than on an upper surface of the pattern. In addition, the secondary electron may have a higher energy on an edge portion facing with the substrate than the inclined surface of the pattern.

The secondary electrons having different energies may be detected to generate signals having different currents, and then, the signals may be amplified and transformed to form image data of the pattern.

Then, the contour detecting portion 110 may detect a contour of the pattern from the image data of the pattern to obtain the pattern image 10 of FIG. 3. For example, the pattern image 10 may be a real pattern image obtained by scanning the pattern from left to right.

Figure 5:
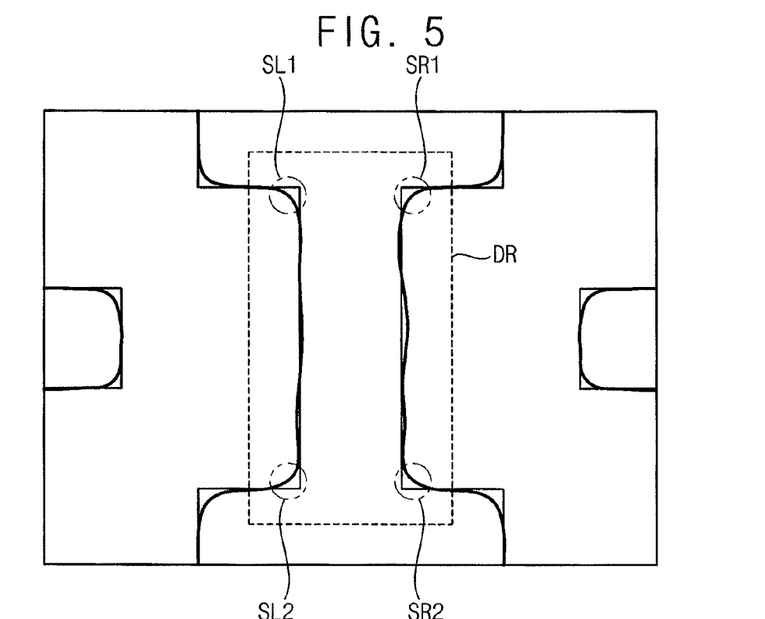
FIGS. 5 to 8 illustrate diagrams of exemplary embodiments of methods of measuring a critical dimension of a pattern.
Figure 6:
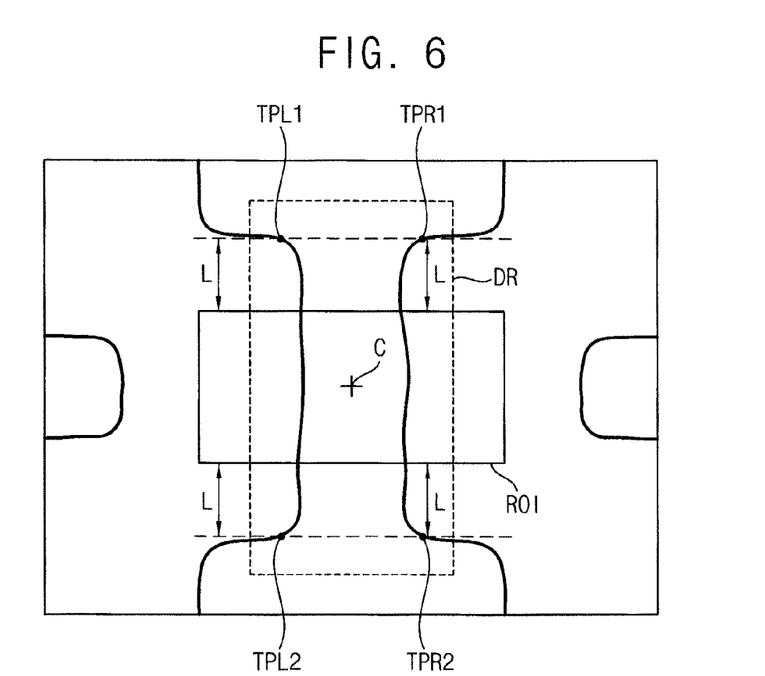

Referring to FIGS. 2, 4 and 5, the design data of the pattern and the pattern image may be matched to determine a detection region (DR) on the pattern image (S110).

More particularly, the design pattern (FIG. 4) may be stored in the memory 130, and the matching portion 120 may receive the design pattern of FIG. 4 from the memory 130. As illustrated in FIG. 5, the matching portion 120 may match the contour of the design pattern and the pattern image to obtain a corresponding relation between the contour of the design pattern and the pattern contour, and may determine the detection region (DR) including one or more single points or regions (SL1, SR1, SL2, SR2) of the pattern contour on the pattern image.

In addition, the single points or regions (SL1, SR1, SL2, SR2) may be selected based on a process bias such as differences of measured values by SEM according to an exposure condition.

Thus, the detection region (DR) may be set based on the corresponding relation between the contour of the design pattern and the pattern contour and so as to include the single points or regions (SL1, SR1, SL2, SR2). The single points or regions (SL1, SR1, SL2, SR2) may be determined in comparison with the design pattern. The predetermined single points or regions may correspond to locations where a tangent line of the pattern contour changes or the pattern contour has an unusual behavior compared to other points.

Referring to FIGS. 2 and 6 to 8, an optimum turning point may be determined in the detection region (DR) (S120), and then, a ROI (region of interest) may be determined within a predetermined range from the optimum turning point (S130).

Figure 7:
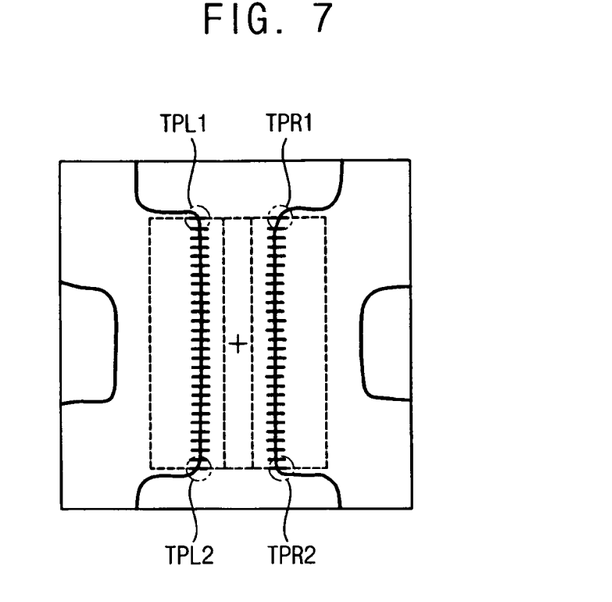
Figure 8:
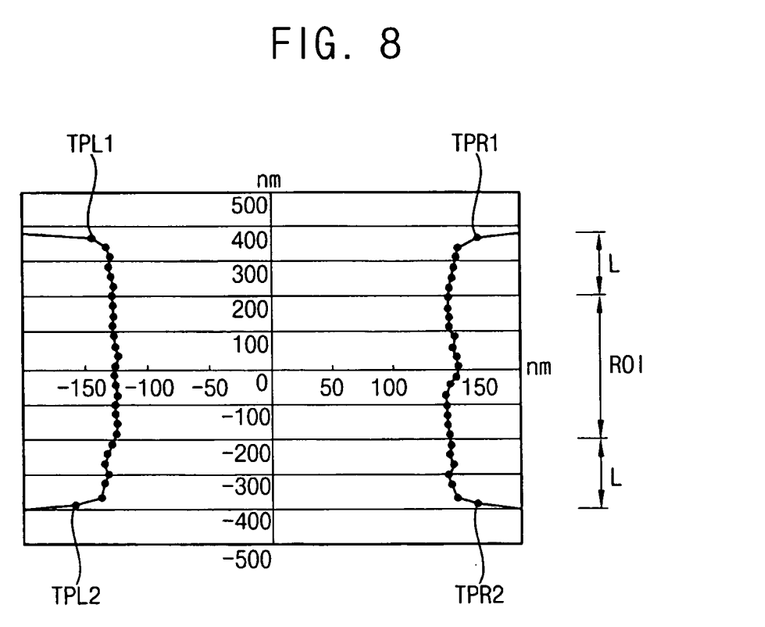

More particularly, as shown in FIGS. 7 and 8, the coordinates may be obtained at predetermined intervals along the contour of the pattern within the detection region (DR), and then, a single point of the coordinates may be determined as an optimum turning point. For example, in one or more embodiments, the predetermined single points or regions may be determined to be the optimum turning point when a tangent line changes, e.g., by a predetermined percentage/range, etc.

For example, as illustrated in FIGS. 7 and 8, the coordinates may be obtained by sampling every 10 pixels along the contour of the pattern. More particularly, e.g., the coordinates for a left line and a right line of the pattern contour may be obtained.

Then, a single point of the coordinates may be determined as an optimum turning point. The single point may be the coordinates where the tangent line of the pattern contour changes, e.g., by a predetermined amount, or the pattern contour has an unusual behavior compared to other coordinates. Accordingly, two optimum turning points (TPL1, TPL2) may be determined along the left line of the pattern contour and two optimum turning points (TPR1, TPR2) may be determined along the right line of the pattern contour.

Then, a ROI may be determined within a predetermined range from the optimum turning points (TPL1, TPR1, TPL2, TPR2) (S130).

In particular, referring again to FIG. 6, a center (C) of the ROI may be determined as an intermediate value of upper optimum turning points (TPL1, TPR1) and lower optimum turning points (TPL2, TPR2). A width or length of the ROI may be determined based on a predetermined distance (L) from the optimum turning points (TPL1, TPR1, TPL2, TPR2).

Referring again to FIG. 8, a critical dimension of the pattern may be measured in the ROI (S140). For example, averages of the coordinates of the pattern contour in the ROI may be calculated to determine a critical dimension of the pattern.

In one or more embodiments of a method of measuring a critical dimension of a pattern, after a pattern image is obtained from a real pattern, the pattern image and a design pattern of the pattern may be matched to determine a detection region on the pattern image. An optimum turning point may be determined in the detection region, and then, a ROI (region of interest) may be determined within a predetermined range from the optimum turning point. A critical dimension of the pattern may be measured in the ROI.

Accordingly, a ROI of a pattern to be detected may be automatically and precisely set and a critical dimension of the pattern may be measured with a relatively high degree of precision. Further, the reproducibility of measured line widths of the pattern may be improved and even a critical dimension of a fine pattern or OPCed pattern (optical proximity corrected pattern) may be measured more precisely.

A series of steps of a method of measuring a critical dimension of a pattern according to an example embodiment may be programmed on a non-transitory computer readable medium such as CD-ROM, or may be executed by a computer. The method of measuring a critical dimension of a pattern may be realized using an image processing computer.

Figure 9:
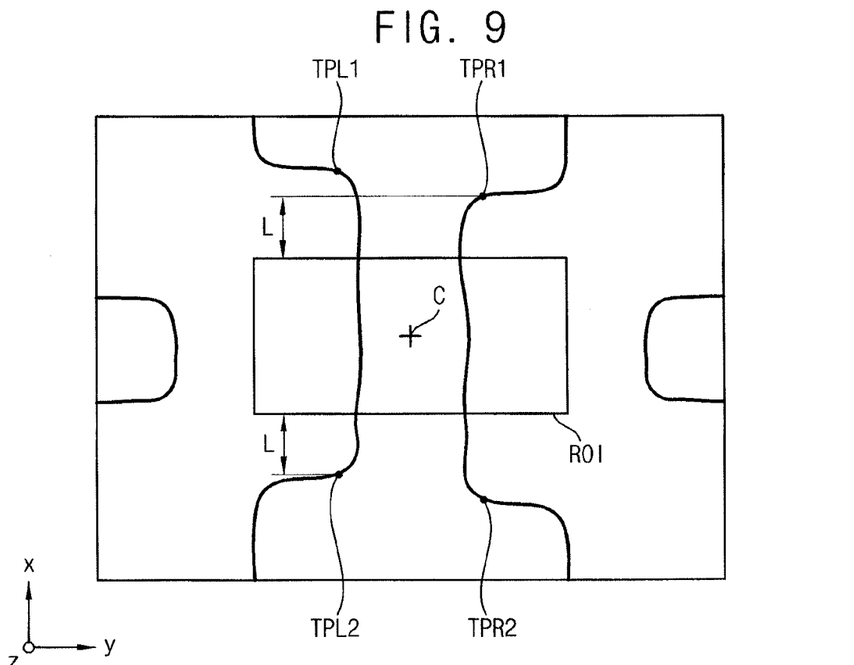
FIG. 9 illustrates a diagram of another exemplary embodiment of a method of measuring a critical dimension of a pattern.

FIG. 9 illustrates a diagram of another exemplary embodiment of a method of measuring a critical dimension of a pattern.

Referring to FIG. 9, the coordinates for the left line and the right line of the pattern contour in the detection region (DR) may be obtained and then two optimum turning points (TPL1, TPL2) may be determined along the left line of the pattern contour and two optimum turning points (TPR1, TPR2) may be determined along the right line of the pattern contour. In the exemplary embodiment of FIG. 9, the upper optimum turning points are asymmetrical to each other and correspond to different scanning lines. In the exemplary embodiment of FIG. 9, the lower optimum turning points are asymmetrical to each other and are in different scanning lines.

In embodiments in which one or more of the corresponding turning points are asymmetrical relative to each other, the ROI may be determined based on a closest one of the upper optimum turning points and a closest one of the lower optimum turning points to the center (C) and/or respective ones of the upper and lower turning points have a smallest distance therebetween along a direction, e.g., along an x-direction. For example, innermost ones of the upper and lower turning points along the x-direction may correspond to optimum turning points. More particularly, e.g., the center (C) of the ROI may be determined based on the intermediate value of the upper optimum turning point (TPR1) and the lower optimum turning point (TPL2) relatively closer to each other. A width, e.g., distance along x-direction, of the ROI may be determined to be spaced apart by a predetermined distance (L) from the upper optimum turning point (TPR1) and the lower optimum turning point (TPL2) relatively closer to each other along a same direction, e.g., x-direction. More particularly, e.g., a width of the ROI may be determined to be spaced apart by a predetermined distance (L) from the upper optimum turning point (TPL1) and a length of the ROI may be predetermined or also based on a distance to other reference points.

Figure 10:
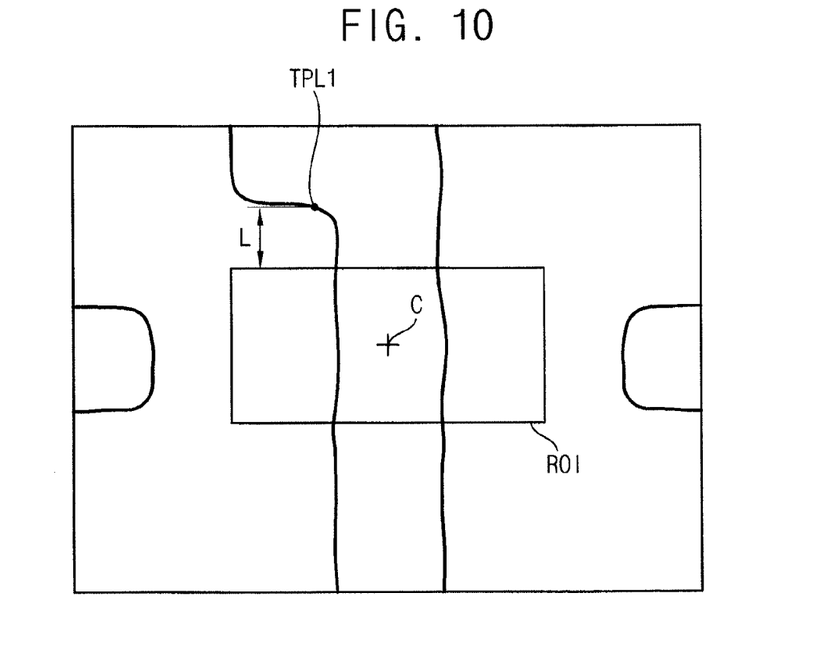
FIG. 10 illustrates a diagram of another exemplary embodiment of a method of measuring a critical dimension of a pattern.

FIG. 10 illustrates a diagram of another exemplary embodiment of a method of measuring a critical dimension of a pattern. Referring to FIG. 10, the coordinates for the left line of the pattern contour in the detection region (DR) may be obtained and then a single point or region of the coordinates may be determined as an optimum turning point. Referring to the exemplary embodiment of FIG. 10, one optimum turning point (TPL1) may be determined along the left line of the pattern. In the exemplary embodiment of FIG. 10, an optimum turning point is not determined along the right line of the pattern contour because a tangent line of the pattern contour does not change significantly and/or the coordinates of the pattern contour do not portray unusual behavior compared to other coordinates.

In the exemplary embodiment of FIG. 10, the center (C) of the ROI may be determined using one upper optimum turning point (TPL1). A length and/or width of the ROI may be determined to be spaced apart by a predetermined distance (L) from the upper optimum turning point (TPL1) and/or may be predetermined.

One or more embodiments provide a method of measuring a critical dimension of a pattern that includes matching a real pattern image and a design pattern of the pattern to determine a detection region on the pattern image, determining an optimum turning point of the real pattern contour in the detection region, and then, determining a ROI (region of interest) within a predetermined range from the optimum turning point. A critical dimension of the pattern may be measured in the ROI.

One or more embodiments may enable a ROI of a pattern to be detected to be automatically and precisely determined and a critical dimension of the pattern to be measured with a relatively high degree of precision. One or more embodiments may enable reproducibility of measured line widths of the pattern to be improved and/or a critical dimension of a fine pattern or OPCed pattern (optical proximity corrected pattern) to be measured more precisely.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of measuring a critical dimension of a pattern, the method comprising:
   obtaining a pattern image from an object pattern;
   matching a design pattern of the object pattern and the pattern image to determine a detection region on the pattern image;
   determining a plurality of optimum turning points of pattern contours in the detection region, wherein a set of points at predetermined intervals along each of the pattern contours in the detection region are determined, and a single point from the set of points for each of the pattern contours is detected as an optimum turning point based on a characteristic of a tangent line;
   setting a ROI (region of interest) within a predetermined range from each of the determined optimum turning points; and
   measuring a critical dimension of the pattern in the ROI.

2. The method as claimed in claim 1, wherein matching to determine the detection region comprises:
   obtaining a corresponding relation between a contour of the design pattern and a contour of the pattern image using design data of the design pattern; and
   determining the detection region including expected single points or regions of the contour on the pattern image based on the corresponding relation.

3. The method as claimed in claim 1, wherein determining the single point as the optimum turning point for each of the pattern contours includes determining one or more coordinates at which the tangent line of each of the pattern contours changes and/or the pattern contour has an unusual behavior compared to other coordinates as the optimum turning point.

4. The method as claimed in claim 3, wherein determining the single point as the optimum turning point for each of the pattern contours includes determining, as the optimum turning point, one or more coordinates at which the tangent line of the pattern contour changes at least by a predetermined amount.

5. The method as claimed in claim 1, wherein setting the ROI comprises:
   calculating a center of the ROI using the optimum turning points; and
   determining a width of the ROI that is offset by a predetermined distance from one or more of the optimum turning points.

6. The method as claimed in claim 1, wherein measuring the critical dimension of the pattern in the ROI comprises:
   obtaining coordinates of the pattern contours in the ROI; and
   calculating an average of the coordinates of one or more of the pattern contours.

7. The method as claimed in claim 1, wherein obtaining the pattern image comprises:
   irradiating and scanning primary electrons on the pattern; and
   detecting secondary electrons from the pattern to obtain the pattern image.

8. The method as claimed in claim 1, wherein at least two of the optimum turning points are asymmetrical.

9. An apparatus for measuring a critical dimension of a pattern, the apparatus comprising:
   a contour detector to detect a pattern contour from a pattern image of an object pattern;
   a determiner to match a design pattern of the object pattern and the pattern image, to determine a detection region on the pattern image;
   a ROI determiner to determine a plurality of optimum turning points of pattern contours in the detection region, wherein a set of points at predetermined intervals along each of the pattern contours in the detection region are determined, and a single point from the set of points for each of the pattern contours is detected as an optimum turning point based on a characteristic of a tangent line, the ROI determiner to set a ROI (region of interest) within a predetermined range from each of the determined optimum turning points; and
   a measurer to measure a critical dimension of the pattern in the ROI.

10. The apparatus as claimed in claim 9, wherein the determiner is to obtain a corresponding relation between a contour of the design pattern and a contour of the pattern image using design data of the design pattern and to determine the detection region, including expected single points or regions of the pattern contour, on the pattern image based on the corresponding relation.

11. The apparatus as claimed in claim 9, wherein the ROI determiner is to calculate a center of the ROI using the optimum turning points and to determine a width of the ROI that is offset by a predetermined distance from one or more of the optimum turning points.

12. The apparatus as claimed in claim 9, wherein the measurer is to obtain coordinates of the pattern contours in the ROI and to calculate an average of the coordinates of one or more of the pattern contours.

13. An apparatus for measuring a critical dimension of an object pattern using a pattern image of the object pattern, the pattern image including a boundary of the object pattern, the apparatus comprising:
- a region-of-interest (ROI) determiner to determine a plurality of optimum reference points along one or more boundaries of the pattern image in a detected region of the object pattern, wherein a set of points at predetermined intervals along the one or more boundaries of the pattern image in the detected region are determined, and a single point from the set of points is detected as an optimum reference point for the one or more boundaries based on a characteristic of a tangent line, the ROI determiner to set a ROI within a predetermined range from the optimum reference points; and
- a measurer to measure a critical dimension of a portion of the pattern in the ROI.

14. The apparatus as claimed in claim 13, further comprising:
- a pattern matcher to align a design pattern of the object pattern and the pattern image to determine the detected region of the pattern image.

15. The apparatus as claimed in claim 14, wherein the pattern matcher determines a plurality of reference points and/or regions along the one or more boundaries of the pattern image in the detected region surrounding a portion of the pattern to be measured by the measurer.

16. The apparatus as claimed in claim 15, wherein the plurality of optimum reference points are determined by sampling every x-th pixel along the boundary of the pattern, where x is an integer equal to or greater than one.

17. The apparatus as claimed in claim 15, wherein the ROI determiner is to determine at least one of the optimum reference points and/or at least one of the regions along one or more of the boundaries of the pattern image to set a ROI region at a predetermined distance from the at least one optimum reference point.

18. The apparatus as claimed in claim 17, wherein the ROI determiner is to determine the at least one of the optimum reference points based on characteristics of a tangent line tangent to the respective points along one or more of the boundaries of the pattern image.

19. The apparatus as claimed in claim 18, wherein the ROI determiner is to determine a plurality of optimum reference points including an upper optimum reference point and a lower optimum reference point along a single direction, and is to set the ROI to be a predetermined distance from each of the upper optimum reference point and the lower optimum reference point.

* * * * *